May 14, 1935.   C. LECLER   2,001,257
RESILIENT CONNECTION
Filed March 19, 1931   3 Sheets-Sheet 1

C. Lecler
INVENTOR

By: Marks & Clerk
Attys.

May 14, 1935. C. LECLER 2,001,257
RESILIENT CONNECTION
Filed March 19, 1931 3 Sheets-Sheet 2

C. Lecler
INVENTOR

May 14, 1935.   C. LECLER   2,001,257
RESILIENT CONNECTION
Filed March 19, 1931   3 Sheets-Sheet 3

C. Lecler
INVENTOR
By Marks & Clerk
Attys.

Patented May 14, 1935

2,001,257

UNITED STATES PATENT OFFICE 2,001,257

RESILIENT CONNECTION

Charles Lecler, Levallois-Perret, France, assignor to Maurice Houdaille, Levallois-Perret, Seine, France Application March 19, 1931, Serial No. 523,890
In France March 21, 1930

1 Claim. (Cl. 287—85).

Resilient joints or connections actually known are generally constituted by two rigid sockets between which is arranged a homogeneous resilient material, such as rubber. This resilient material, which has the general shape of a tube after assemblage, is homogeneous and continuous. Moreover, in order to ensure a satisfactory adherence between the inner and outer tubes and the homogeneous and continuous resilient connecting body, the latter is compressed between the tubes or alternatively, nonvulcanized rubber can be interposed between these tubes and the whole is subsequently vulcanized. A satisfactory adherence between the members and the resilient material is thus obtained, either by compression, or by vulcanization. Such joints have been made according to numerous methods of manufacture which have not given entirely satisfactory results. In fact, in all cases, during use, a sliding movement takes place between the inner tube of small diameter and the corresponding rubber wall. Moreover, the value of the relative displacement between members resiliently connected as previously indicated is very limited, as it is a function of the initial adherence between these members and the resilient material, this adherence remaining substantially constant.

The present invention is adapted to remedy these inconveniences and to prevent any sliding movement of the sockets relatively to the resilient mass or body; this result is obtained by the fact that, in the improved joint according to the invention, the relative displacements of the sockets produce an increase of the tension of the resilient material and, consequently, of its adherence, although however the sockets remain smooth.

The invention consists for that purpose in producing, in the mass of rubber, discontinuous surfaces, in such a manner that to any relative movement of the sockets corresponds not only molecular distortions of the rubber, but also and particularly a propping or self-clamping action, which increases the tension of the material and its adherence. The phenomenon taking place can be compared, according to circumstances:— either to the propping action which occurs in free wheels or movement selecting devices provided with balls, rollers or other propping members, in which the relative movement of the crowns generates a powerful compression of the propping members. It will be understood that this propping phenomenon takes place as well if the said members are made of rubber or other resilient material. It does not occur at all if the mass is homogeneous, in the same way as no propping action would be obtained if a smooth bearing was used between the two rings or crowns of a free wheel,—or to the automatic clamping action taking place in winding or unwinding brakes,—or to the combination of the propping and self-braking actions.

The method of construction of resilient joints or connections, previously set forth, can be carried according to a large number of modifications which are obviously all included in the scope of the invention and which can differ from each other particularly:—by the shape and construction of the rigid members or parts between which is arranged the resilient connecting material;—by the construction of the resilient connecting material as well as by the method employed for forming discontinuities in the mass of rubber when the latter is fitted in position, these discontinuities being obtained:—either by the method of fitting up the rubber mass,—or by cuts previously formed in the rubber.

The invention also relates to the new industrial products obtained in accordance with the process forming the subject-matter of the invention and in which the resilient connecting mass is either:

(a) constituted by a strip wound on itself so as to have in cross-section the shape of a spiral, (b) or formed by a cylinder or a tubular cone having at least one separation in helix shape, (c) or made in the form of a cylindrical or conical tube having partial radial slots, (d) or obtained by the juxtaposition of blocks having, in cross-section, the shape of a portion of a sector, (e) or obtained by the juxtaposition of similar elements of suitable shape.

The invention has for further object a process for the construction of resilient joints which allows, independently of the angular displacements about the longitudinal axis of the entire joint, oscillations about a centre located on this longitudinal axis.

This process consists in producing, in a resilient connecting mass, between two members to be resiliently connected, internal variable tensions so as to facilitate, independently of the angular displacements, oscillations without allowing any relative sliding movement between the surfaces in contact; the resilient mass or body can be homogeneous or can present discontinuities.

This latter process can be carried out according to a large number of modifications which are all included in the scope of the invention and can differ from each other by the means allowing to obtain a difference of internal tension in the resilient mass; it is particularly possible:—either to force into a housing of suitable shape a resilient material having, before being placed in position, a shape different from that of this housing,—or to distort one of the members receiving the rubber.

The invention also includes in its scope all the applications of the process forming the subject-matter of the invention and particularly the application of the products obtained by these processes, to the constitution of resilient joints or connections between two members and, generally speaking, in every case it is necessary to obtain a relative displacement (rotation or oscillations) between two members without using a lubricant, or to have a silent joint or connection.

The accompanying drawings illustrate, by way of example only, forms of construction of new industrial products according to the invention.

The process forming the subject-matter of the invention and the new industrial products obtained by this process are capable of receiving a large number of modifications some of which are indicated hereinafter by way of example only.

Figure 1:
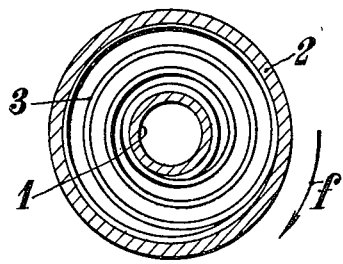
Fig. 1 is an explanatory diagrammatic view.

In Fig. 1 are diagrammatically shown elements or tubes 1 and 2 to be resiliently connected. In order that one of the forms of carrying out the invention may be understood, a spiral spring is shown as being interposed between the tubes 1 and 2. It will be understood that if the tube 1 moves in the direction of the arrow $f$, the tube 2 remaining fixed, the spring is caused to wind on this tube 1 and, consequently, a self-clamping action takes place. In case the tube 1 moves in reverse direction to the arrow $f$, the spring 3 is caused to expand owing to its unwinding, and, consequently, a propping action takes place.

Figure 2:
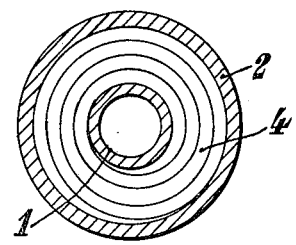
Fig. 2 is a cross-section of a first form of construction.

Fig. 2 corresponds to Fig. 1, but the spring 3 is replaced by a rubber strip tightly wound on itself so as to have in section the shape of a spiral. This rubber strip can be compressed, after it has been fitted in position, by any known means. Such an arrangement ensures a perfect resilient connection between tubes 1 and 2; moreover, the adherence between the tubes 1 and 2 and the resilient material 4, increases in function of the stresses which tend to produce a sliding movement.

Figure 3:
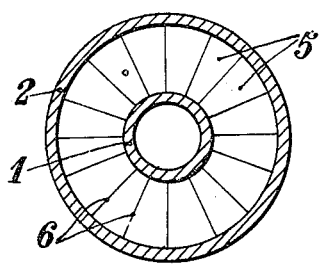
Fig. 3 is a cross-section of a second form of construction.
Figure 5:
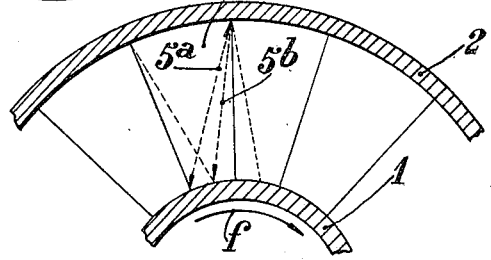
Fig. 5 is an explanatory diagrammatic view.

Fig. 3 illustrates a constructional modification in which blocks 5 juxtaposed according to radial planes, are arranged between the tubes 1 and 2. In this form of construction and as shown more particularly in Fig. 5, in case the tube 1 moves in the direction of the arrow $f$, a distortion of the block 5, and consequently a propping action takes place; a fictitious fibre previously at 5$^a$ moves to 5$^b$, where it is compressed by increasing the adherence between the rubber and the tubes.

Figure 4:
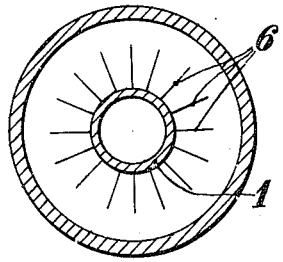
Fig. 4 is a cross-section of a modification.

Fig. 4 shows a modification in which the entire rubber mass is provided with partial radial cuts 6.

Figure 6:
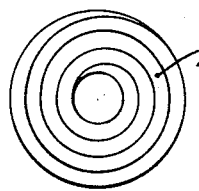
Fig. 6 is an end view of a resilient strip wound in a spiral.

Fig. 6 shows in end view a thin rubber strip 7 wound in a spiral for constituting a tubular connecting cone or cylinder between two tubes such as 1 and 2. The rubber strip can, in certain cases, be replaced by a cord of any suitable shape as shown in Fig. 10.

Figure 7:
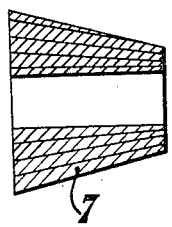
Figs. 7, 8, 9 and 10 are cross-sections of modifications.
Figure 8:
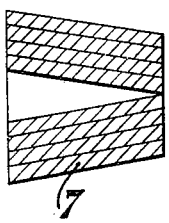
Figures 9, 10:
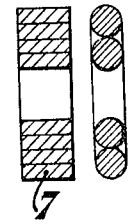

Figs. 7, 8 and 9 illustrate constructional modifications obtained with strips 7 having different cross-sections.

Figure 11:
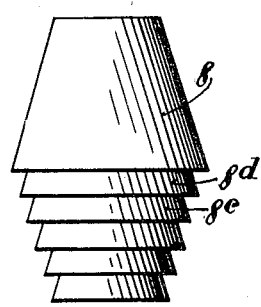
Figs. 11, 12 and 13 are elevations of other modifications.
Figure 12:
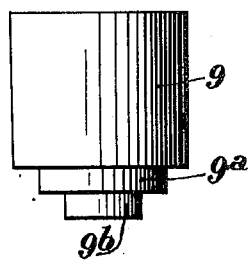
Figure 13:
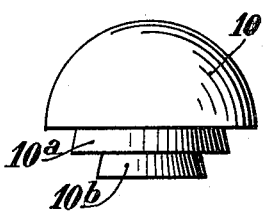

As shown in Figs. 11, 12, 13, the resilient device can be constituted by the juxtaposition of identical resilient elements 8, 8$^a$, 8$^b$, 9, 9$^a$, 9$^b$, 10, 10$^a$, 10$^b$ of any suitable shape according to the applications and which are fitted into each other.

Figure 14:
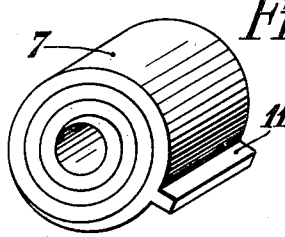
Fig. 14 is a perspective view of a modification of the form of construction illustrated in Fig. 6.

Fig. 14 is a constructional modification relating to Fig. 6. In this modification, a transverse hooking rib 11 is provided near the outer end of the strip 7. This rib can be fitted into a suitable opening provided in the outer tube 2. It is obvious that the inner end of the strip 7 could be similarly attached to the inner tube 1.

Figure 15:
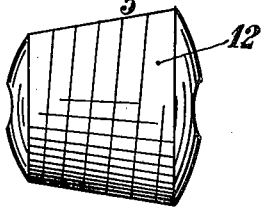
Figs. 15, 16 and 17 are elevations of other forms of construction provided with cuts in helix shape.
Figure 16:
Figure 17:

Fig. 15 illustrates a constructional modification in which the tubular rubber body is provided with a partial or total cut having preferably the shape of a helix 12. Such an arrangement allows to obtain the same advantages as those indicated for the construction of Figs. 1 and 2.

It is obvious that the resilient connection can be obtained by combining several devices previously described constructional modifications in which the resilient bodies are provided with helical cuts of reverse pitch.

Figure 18:
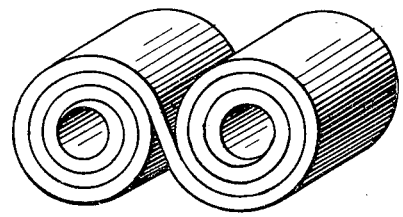
Figs. 18 and 19 are perspective views of double devices.
Figure 19:
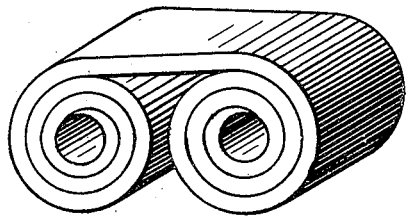

Figs. 18 and 19 illustrate double windings more particularly utilizable for resiliently connecting parts of machines. In certain cases, twisted rubber bands could be employed.

Figure 20:
Figs. 20 and 21 are perspective views of elements for various applications.
Figure 21:

Figs. 20 and 21 illustrate other modifications of resilient elements, the superposition of which allows to obtain a resilient connection device according to the invention.

In certain cases, the parts adjacent to the discontinuities can be distinctly separated by interposition of resilient or like independent strips or materials.

Figure 22:
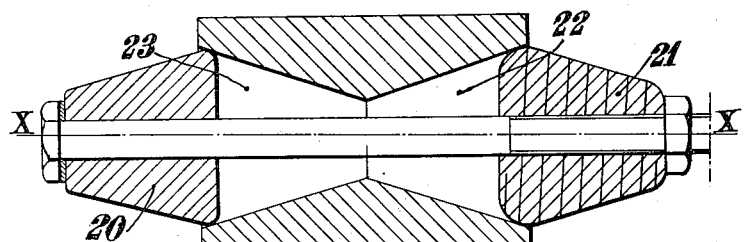
Fig. 22 is an axial section of another form of construction facilitating the oscillations, the parts being shown at the beginning of the assembling operation.
Figure 23:
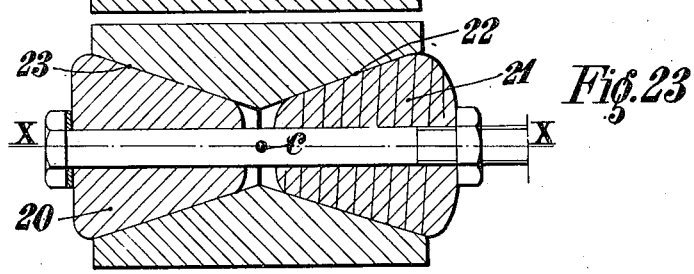
Fig. 23 is a corresponding axial section showing parts fitted in position.

Figs. 22 and 23 illustrate a form of construction of a resilient joint according to the invention and in which the rubber body, which can be homogeneous and continuous, or can present discontinuities, is subjected to different internal tensions in order to facilitate oscillations about a point C.

In this form of construction, the frustum-shaped resilient body 20 and 21 is forced into frustum-shaped housings 22 and 23, but in such a way that after being fitted in position the large bases of the frustums of the resilient material correspond to the small bases of the housings. It will be understood that such an arrangement allows for a variable tension which is lower near the outer region, the adherence being a function of the variation of pressure. Such a device which allows angular displacements without slipping about the longitudinal axis X X, facilitates the oscillations of this axis about the point C.

Figure 24:
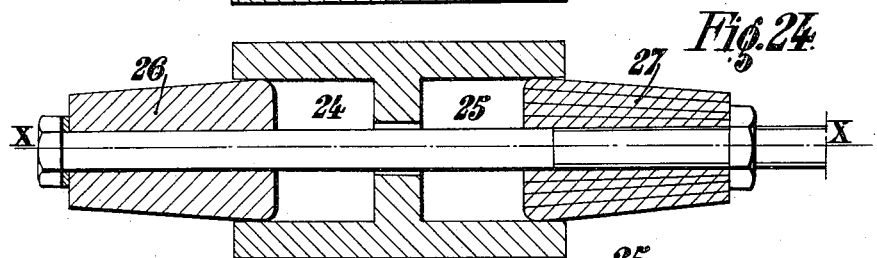
Fig. 24 is a constructional modification, the parts being shown at the beginning of the assembling operation.
Figure 25:
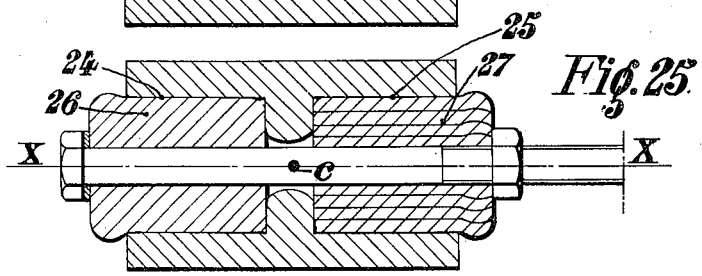
Fig. 25 is a corresponding axial section showing the parts fitted in position.

The same result can be obtained by employing, as shown in Figs. 24 and 25, cylindrical housings 24 and 25 and frustum-shaped resilient blocks 26 and 27.

Figure 26:
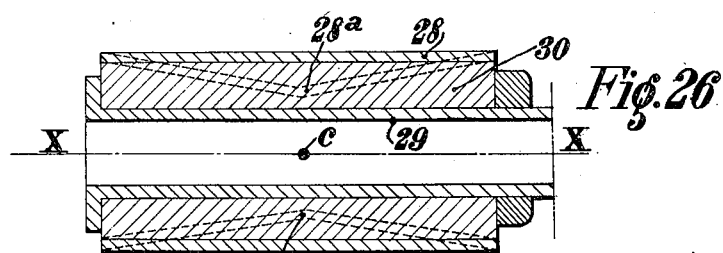
Fig. 26 is an axial section of another modification.

Fig. 26 illustrates a constructional modification, in which the increase of internal tension and adherence in the central region, is obtained by distorting, as indicated in dot and dash lines at 28ª, an outer tube 28, between which and an inner tube 29 is arranged a resilient material 30.

It is obvious that the inner tube 29 might quite as well be distorted.

Moreover, it will be noted that in the forms of construction shown in Figs. 22 to 26, the resilient material can be homogeneous and continuous, or can be provided with discontinuities as previously indicated, the use of a discontinuous material being however preferable.

It will also be noted, as shown in Figs. 22 to 25, that the joints can be easily taken to pieces and adjusted.

It is obvious that the forms of construction described and illustrated are only simple examples capable of receiving numerous modifications, which, as long as they do not alter in any way the main features above set forth and the result desired, remain included in the scope of the invention.

What I claim as my invention and desire to secure by Letters Patent is:

In a resilient torsion joint having two cylindrical members one of which is hollow and surrounds the other, means for resiliently resisting relative rotation between the two members comprising a single rubber strip wound upon itself so that the adjacent convolutions are in intimate contact with each other, and said strip being arranged between said members in such close contact with the opposed surfaces thereof that the adherence between the rubber strip and both cylindrical members and between the convolutions of said strip increases in proportion to the increase in relative angular displacement of said cylindrical members in either direction whereby relative sliding movement between said members and said strip is prevented.

CHARLES LECLER.